United States Patent
Xu et al.

(10) Patent No.: US 9,280,360 B2
(45) Date of Patent: Mar. 8, 2016

(54) BOOTSTRAPPING FROM A REMOTE DISK IMAGE VIA A NETWORK

(71) Applicant: Futurewei Technologies, Inc., Plano, TX (US)

(72) Inventors: Jun Xu, Cupertino, CA (US); Rangaraju Iyengar, Morgan Hill, CA (US)

(73) Assignee: Futurewei Technologies, Inc., Plano, TX (US)

( * ) Notice: Subject to any disclaimer, the term of this patent is extended or adjusted under 35 U.S.C. 154(b) by 161 days.

(21) Appl. No.: 14/304,158

(22) Filed: Jun. 13, 2014

(65) Prior Publication Data
US 2014/0372744 A1 Dec. 18, 2014

Related U.S. Application Data
(60) Provisional application No. 61/835,388, filed on Jun. 14, 2013.

(51) Int. Cl.
*G06F 9/44* (2006.01)
*H04L 29/12* (2006.01)

(52) U.S. Cl.
CPC .......... *G06F 9/4416* (2013.01); *H04L 61/2023* (2013.01)

(58) Field of Classification Search
CPC ........................... G06F 9/4416; H04L 61/2023
See application file for complete search history.

(56) References Cited

U.S. PATENT DOCUMENTS

| | | | |
|---|---|---|---|
| 7,234,053 B1 | 6/2007 | Mahmoud | |
| 2006/0107030 A1 | 5/2006 | Biondi et al. | |
| 2007/0214348 A1 | 9/2007 | Danielsen | |
| 2007/0260868 A1* | 11/2007 | Azzarello | G06F 9/4406 713/2 |
| 2011/0296159 A1 | 12/2011 | Hong et al. | |
| 2012/0102159 A1 | 4/2012 | Luo | |
| 2013/0013910 A1* | 1/2013 | Temporelli | G06F 9/4416 713/2 |
| 2013/0290694 A1* | 10/2013 | Civilini | H04L 41/28 713/2 |

OTHER PUBLICATIONS

Anonymous, "Diskless Remote Boot in Linux," Retrieved from the Internet: URL:http://en.wikipedia.org/w/index.php?title=Diskless_Remote_Boot_in_Linux&oldid=542433962 retrieved on Sep. 4, 2014, XP055138327, 4 pages.
Foreign Communication From a Counterpart Application, PCT Application No. PCT/US2014/042302, International Search Report dated Sep. 15, 2014, 5 pages.
Foreign Communication From a Counterpart Application, PCT Application No. PCT/US2014/042302, Written Opinion dated Sep. 15, 2014, 8 pages.

* cited by examiner

*Primary Examiner* — Albert Wang
(74) *Attorney, Agent, or Firm* — Conley Rose, P.C.; Grant Rodolph; Brandt D. Howell (57) ABSTRACT

A method of bootstrapping from a remote image file comprising loading, by a processor, an initial bootloader, employing the initial bootloader to download a final bootloader from the remote image file via a network, employing the final bootloader to mount the remote image file as a block device, downloading a kernel and root file system mounting data from the remote image, and executing the kernel to bootstrap the processor based on the root file system mounting data.

20 Claims, 5 Drawing Sheets

BOOTSTRAPPING FROM A REMOTE DISK IMAGE VIA A NETWORK

CROSS-REFERENCE TO RELATED APPLICATIONS

The present application claims priority to U.S. Provisional Patent Application 61/835,388 filed Jun. 14, 2013 by Jun Xu and Rangaraju Iyengar and entitled "Booting From a Live Compact Disk (CD) Off the Network," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Bootstrapping, also known as booting, may refer to a self-sustaining process of loading basic software, such as an operating system, into memory in order to load and/or manage additional software on an as needed basis. A network element, such as a router or switch, may bootstrap from data stored on a local physical drive. In some cases a network administrator may wish to ensure that a plurality of network elements boot by employing a consistent set of basic software. Accordingly, a disk image of the basic software may be created and loaded onto each network element. For example, a Live Compact Disc (CD) may be employed. A Live CD may be a complete read only bootable computer installation, including an operating system, which may be run from a CD input without installation into a secondary storage, such as a hard drive. A Live CD may consume significantly less memory than an installation CD, but may still require the Live CD image be present in a local persistent media, such as a CD-Read Only Memory (CD-ROM) tray. Such a system may employ a bootloader, such as uBoot to boot from a local image. For example, uBoot may be employed by embedded systems that do not comprise a Basic Input/Output System (BIOS) to boot from a local image.

SUMMARY

In one embodiment, the disclosure includes a method of bootstrapping from a remote image file comprising loading, by a processor, an initial bootloader, employing the initial bootloader to download a final bootloader from the remote image file via a network, employing the final bootloader to mount the remote image file as a block device, downloading a kernel and root file system mounting data from the remote image, and executing the kernel to bootstrap the processor based on the root file system mounting data.

In another embodiment, the disclosure includes a network element (NE) comprising a transmitter, a receiver, a memory, and a processor coupled to the transmitter, receiver, and memory, configured to cause the NE to load an initial bootloader to memory, execute the initial bootloader to download a final bootloader from a remote image file via a network, execute the final bootloader to mount the remote image file as a block device, download a kernel and root file system mounting data from the remote image, and execute the kernel as part of a bootstrapping process based on the root file system mounting data.

In another embodiment, the disclosure includes an NE comprising a memory configured to store a bootable image file comprising a bootloader, a kernel, and root file system mounting data, wherein the bootloader is configured to mount the image file and download the kernel and the root file system mounting data when executed by a client, and wherein the kernel is configured to mount the image file based on the root file system mounting data when executed by the client, a receiver configured to receive download requests from the client, a processor coupled to the memory and the receiver and configured to process download requests from the client, and a transmitter coupled to the processor and configured to transmit at least some of the bootable image file to the client via a network in response to download requests from the client.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

NEs may alternatively employ network booting by employing a network bootloader such as Netboot. In a netboot based system, a network element may employ a bootstrap protocol and/or a Dynamic Host Configuration Protocol (DHCP) to determine the location of a server housing a bootable disk image, such as an International Standards Organization (ISO) 9660 file, which may be referred to as an ISO file and/or an .iso file. An ISO file may comprise a copy of a file system, in binary format, as the file system was stored upon creation of the file. Upon receiving the location of a disk image, the entire image, including a kernel, may be retrieved via the network, stored in Random Access Memory (RAM), and decompressed. The network element may employ software drivers to mount the file system from the image file for further use. The transmission and decompression of the image on bootstrapping may employ significant resources, such as network bandwidth for copying large image files and memory and Central Processor Unit (CPU) resources for decompressing the compressed image.

Disclosed herein is a mechanism for bootstrapping a network element from a remote image file via a network. The network element may be configured to mount the remote image as an Internet Small Computer System Interface (ISCSI) device, which may allow the network element to only download portions of the remote image on an as needed basis in order to reduce usage of network resources. On startup, the network element may employ an initial bootloader (e.g. a Preboot Execution Environment (PXE) Read Only Memory (ROM)) to contact a boot server, such as a DHCP server, and obtain an Internet Protocol (IP) address of a server comprising a remote image file, a filename of the image file (e.g. an ISO file), and a location of a final bootloader in the image file. The initial bootloader may then download a final bootloader from the image file. The final bootloader may obtain a kernel and root file system mounting data from the image file. The final bootloader may not download an entire initial root file system, and may only download mounting data needed to allow the kernel to mount the image file. The kernel then may begin booting from the initial root file system (e.g. an initial ramdisk (initrd) file) on the mounted image file and complete booting from the image file by downloading only the portions of the image file needed to complete the bootstrapping process. By employing the mechanism discussed herein, the network element may bootstrap from a remote image file over the network and load only needed files to RAM. Accordingly, the network element may be configured to operate without an internal hard disk or an internal CD-ROM tray.

Figure 1:
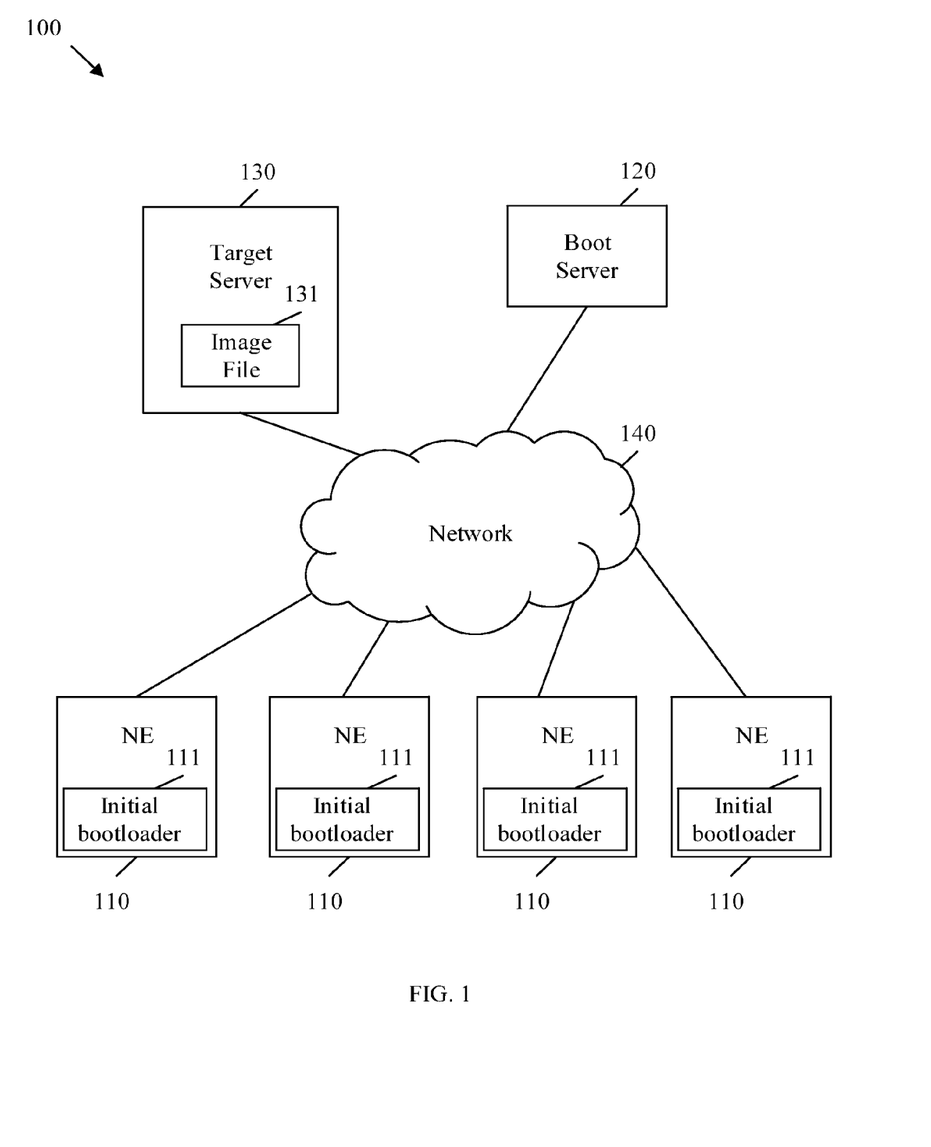
FIG. 1 is a schematic diagram of an embodiment of a network configured to support bootstrapping from a remote image file.

FIG. 1 is a schematic diagram of an embodiment of a network 100 configured to support bootstrapping from a remote image file 131. Network 100 may comprise a plurality of NEs 110 each comprising an initial bootloader 111, which may boot from an image file 131 stored in a target server 130. The NEs 110 may contact a boot server 120 to via network 140 to determine the location and configuration of the target server 130 and/or image file 131.

An NE 110 may be any network device configured to boot from a remote image file 131. An NE 110 may be considered a client device because the NE 110 may receive data from the server. For example, an NE 110 may be a network infrastructure device, such as a router, switch, network management node, gateway, etc. As another example, NE 110 may be an end user device. NE 110 may not comprise a local file system, operating system, programs, etc. Further, NE 110 may not comprise a hard disk drive. NE 110 may comprise an initial bootloader 111, such as a PXE ROM or other initial bootloader executable program. The initial bootloader 111 may be comprise sufficient instructions to cause a local processor to contact boot server 120 to determine the location of image file 131, cause the NE 110 to download a final bootloader from image file 131, and initiate execution of the final bootloader on a local processor before terminating. For example, the initial bootloader 111 may be a firmware circuit, which may be activated upon receiving power at the local processor.

Boot server 120 may be any network device configured to maintain data indicating the location and configuration of image file 131 on network 100 and return such data to a client node upon request. For example, boot server 120 may be a DHCP server. Boot server 120 may receive requests for the image file 131 from initial bootloaders 111, and may respond to the requests by indicating the current IP address of target server 130, the current file name of the image file, and sufficient configuration data for the initial bootloader 111 to download a final bootloader from the image file (e.g. via direct download of a final bootloader file, mounting of the image file 131, etc.). Requests and responses between the boot server 120 and NEs 110 may be transmitted via network 140, which may be any electrical, optical, and/or electro-optical wired and/or wireless network configured to transport frames and/or packets between nodes of network 100. It should be noted that, while only one boot server 120 is shown for purposes of clarity, boot server 120 may be also be implemented by a server cluster, one or more virtual machines, etc.

Target server 130 may be any network device configured to store an image file and return the image file to an NE 110 upon request. For example, target server 130 may comprise a server, a server cluster, a virtual machine operating on one or more hardware network elements, etc. Regardless of implementation, target server 130 may maintain the location of image file 131 with boot server 120 and/or return portions of image file 131 to NEs 110 via network 140 upon request. Image file 131 may be stored on target server 130 and may comprise a final bootloader, a kernel, an initial root file system, root file system mounting data, system files, and/or any other files that may be made available to an NE 110 during the course of normal operation by the NE (e.g. during and/or after bootstrapping). Image file 131 may be discussed in more detail herein below. In an embodiment, target server 130 and boot server 120 may also be implemented in a single device.

Image file 131 may comprise a set of data, for example, encoded as raw binary and/or hexadecimal blocks, with each block of data being associated with a file. Upon obtaining configuration and/or mounting data, a process may become aware of a structure associated with the raw data. Upon obtaining the configuration and/or mounting data, a process may treat the data structure as a device comprising data blocks (e.g. a block device) in a manner similar to a physical device. The process of determining a structure to raw data, loading metadata of a file system data into system memory for the purpose of serving client processes, and treating the data blocks as a block device may be referred to as mounting.

NEs 110 may execute initial bootloaders 111 upon startup. Each initial bootloader 111 may be configured to query the boot server 120 to obtain location and configuration data associated with the image file 131 to allow an associated NEs 110 to download files from the image file 131 and/or mount the image file 131 as a block device. Each initial bootloader 111 may be configured to download and execute a final bootloader from the image file. The final bootloader may be employed to download a kernel and/or a root file system, as discussed below, to facilitate bootstrapping of the NE 110 processor(s) without downloading the entire image file 131 to the NE 110. By downloading only relevant portions of the image file 131, which may comprise data used to bootstrap a plurality of devices and device types, the NEs 110 may store the downloaded files in RAM and may not require a hard disk. Additionally, removal of the hard disk may reduce NE 110 power requirements and decrease complexity and cost of the NE 110. Further, downloading only relevant portions of the image file 131 may reduce overall network traffic.

Figure 2:
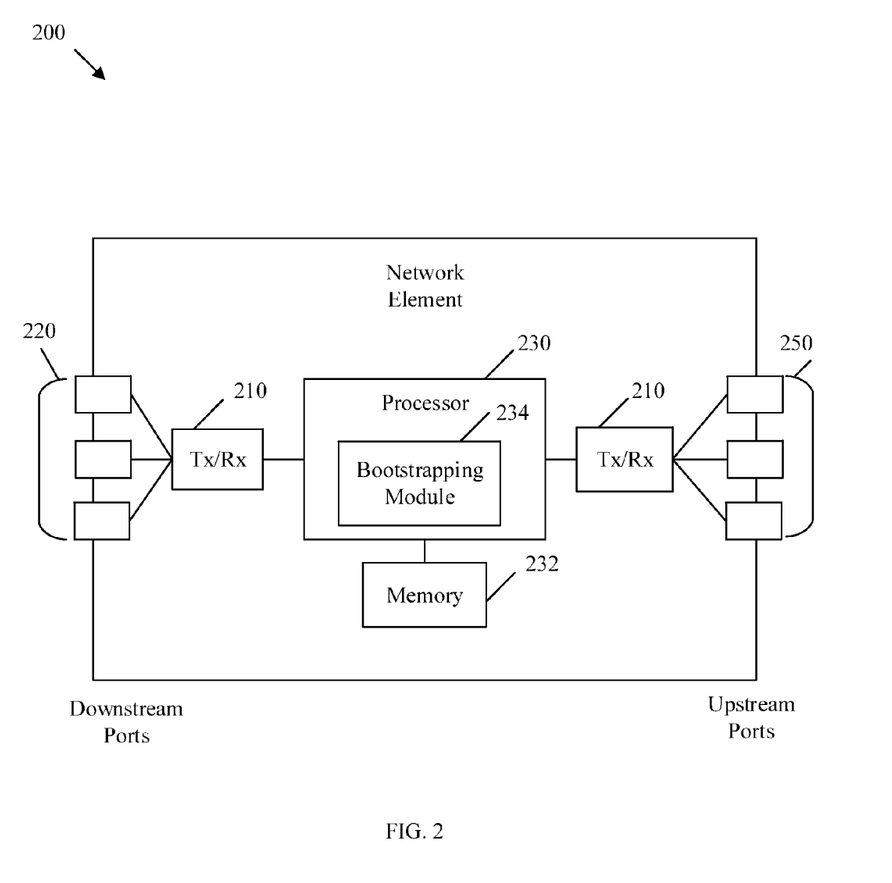
FIG. 2 is a schematic diagram of an embodiment of an NE within a network.

FIG. 2 is a schematic diagram of an embodiment of an NE 200 within a network, such as an NE 110, a boot server 120, and/or a target server 131. In some embodiments, NE 200 may be any component in network 100. NE 200 may be implemented in a single node or the functionality of NE 200 may be implemented in a plurality of nodes. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments. At least some of the features/methods described in the disclosure may be implemented in a network apparatus or component such as an NE 200. For instance, the features/methods in the disclosure may be implemented using hardware, firmware, and/or software installed to run on hardware. The NE 200 may be any device that transports frames through a network, e.g., a switch, router, bridge, server, a client, etc. As shown in FIG. 2, the NE 200 may comprise transceivers (Tx/Rx) 210, which may be transmitters, receivers, or combinations thereof. A Tx/Rx 210 may be coupled to a plurality of downstream ports 220 (e.g. downstream interfaces) for transmitting and/or receiving frames from other nodes and a Tx/Rx 210 coupled to a plurality of upstream ports 250 (e.g. upstream interfaces) for transmitting and/or receiving frames from other nodes, respectively. A processor 230 may be coupled to the Tx/Rxs 210 to process the frames and/or determine which nodes to send frames to. The processor 230 may comprise one or more multi-core processors and/or memory devices 232, which may function as data stores, buffers, RAM, ROM, etc. Processor 230 may be implemented as a general processor or may be part of one or more application specific integrated circuits (ASICs) and/or digital signal processors (DSPs). Processor 230 may comprise a bootstrapping module 234, which may implement the methods discussed herein such as transmitting portions of a bootable image file, requesting portions of a bootable image file, executing portions of a bootable image file, mounting a bootable image file as a block device, etc. In an alternative embodiment, the bootstrapping module 234 may be implemented as instructions stored in memory 232, which may be executed by processor 230, or implemented in part in the processor 230 and in part in the memory 232. In another alternative embodiment, the bootstrapping module 234 may be implemented on separate NEs. The downstream ports 220 and/or upstream ports 250 may contain electrical and/or optical transmitting and/or receiving components. It should be noted that, when implementing an NE 110, NE 200 may not comprise a CD-ROM input, a hard disk drive, and/or any non-volatile writable memory components. A non-volatile writable memory component may be any memory device that can be written to and may retain data while powered off.

It is understood that by programming and/or loading executable instructions onto the NE 200, at least one of the processor 230, bootstrapping module 234, Tx/Rxs 210, memory 232, downstream ports 220, and/or upstream ports 250 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
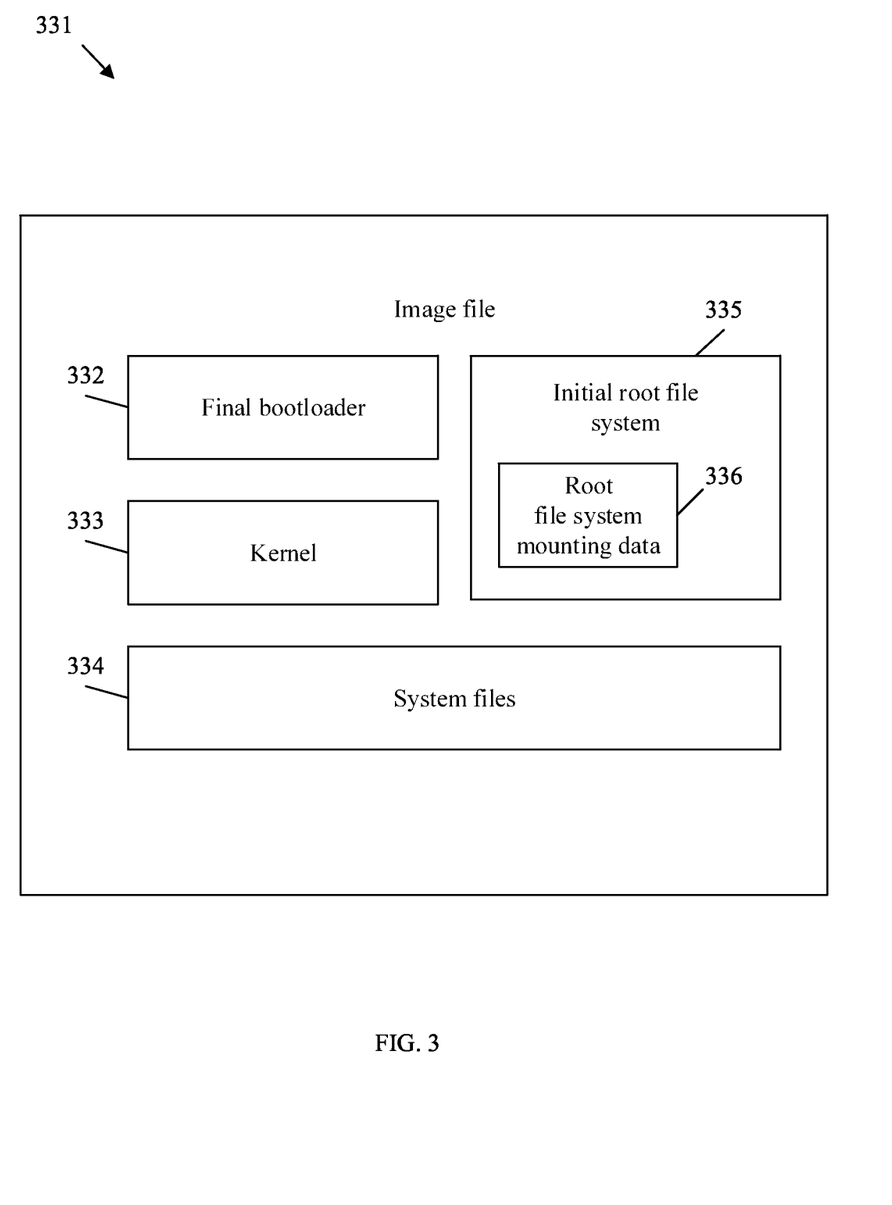
FIG. 3 is a schematic diagram of an embodiment of an image file.

FIG. 3 is a schematic diagram of an embodiment of an image file 331. Image file 331 may be a bootable image file substantially similar to image file 131, may be stored on a target sever such as target server 130, and may be downloaded on an as needed basis by a client device such as NE 110 via a network such as network 140. Image file 331 may be an .iso file and may comprise a final bootloader 332, a kernel 333, an initial root file system 335 comprising root file system mounting data 336, and/or system files 334.

Final bootloader 332 may be a set of instructions configured to cause a processor on a client to load a kernel, such as kernel 333, to in order to bootstrap the processor into a self-sustaining process. Specifically, the final bootloader 332 may be transmitted to a client upon request (e.g. by an initial bootloader 111). The final bootloader 332 may have booting information that is standardized network wide, updated by the system administrator, and unavailable to the client device. For example, the final bootloader 332 may be configured with configuration data indicating the structure of image file 331. When executed by a client, the final bootloader 332 may employ the configuration data to mount the image file as a block device, which may allow the processor to download individual files from the image file 331 rather than downloading the entire image file. For example, upon execution, the final bootloader 332 may be configured to download the kernel 333 and the initial root file system 335 from the image file and initiate execution of the kernel 333 on the client processor.

Initial root file system 335 may be an initial file system configured to be employed by kernel 333 during a bootstrapping process. In an embodiment, the initial root file system 335 may comprise system files needed by the kernel 333 to complete a bootstrapping process, such as root file system mounting data 336, system drivers, configuration files, and/or any files that may be accessible to the client upon bootup. Root file system mounting data 336 may comprise instruction data such as executables, scripts, and/or extensible kernel modules that allow a kernel to mount a final root file system. The initial root file system 335 may comprise a general file needed to set up a general file system, in which case the kernel 333 may proceed to setting up a final root file system with files from system files 334. As an example, the initial root file system 335 may be an initrd file for a Linux system. The initial root file system 335 may comprise root file system mounting data 336. The root file system mounting data 336 may be configuration data, which may be employed by kernel 333 to mount the image file as a block device.

Kernel 333 may be any process configured to bootstrap a processor in a client. For example, kernel 333 may be initiated by final bootloader 332. The kernel 333 may the download and execute the initial root file system 335 comprising the initial root file system mounting data 336. The kernel 333 may employ the initial root file system mounting data 336 to mount a final root file system from the system files 334 without downloading the entire image file 331. The kernel 333 may employ the final root file system to complete the bootstrap process. In another embodiment, the kernel 333 may execute the final root file system to load general system drivers and configuration files, such as files designed for a class of devices. The kernel 333 may then download specific drivers and/or configuration files from system files 334 that are tailored to the specific client. Accordingly, the kernel 333 may download files from the mounted image file 331 as needed to complete the bootstrap process and as needed during the life of the process after bootstrapping is complete.

System files 334 may comprise any files an administrator wishes to make available to a client during operation. For example, system files 334 may comprise a plurality of file systems for a plurality of client device types. Each client device may only download the file system(s) that may be employed on the associated client. As another example, system files 334 may comprise any other programs, applications, system tools, data files, configuration files, etc. that a system administrator wishes to make available to clients that have access to the image file 331 after bootstrapping is complete. A kernel 333 may download such additional files on an as needed basis, which may reduce network load and decrease startup time. For example, a system tool may not be downloaded to a client device until the client device has need of the system tool during normal operation. If the system tool is not needed, the system tool may not be downloaded, which may reduce network traffic.

Figure 4:
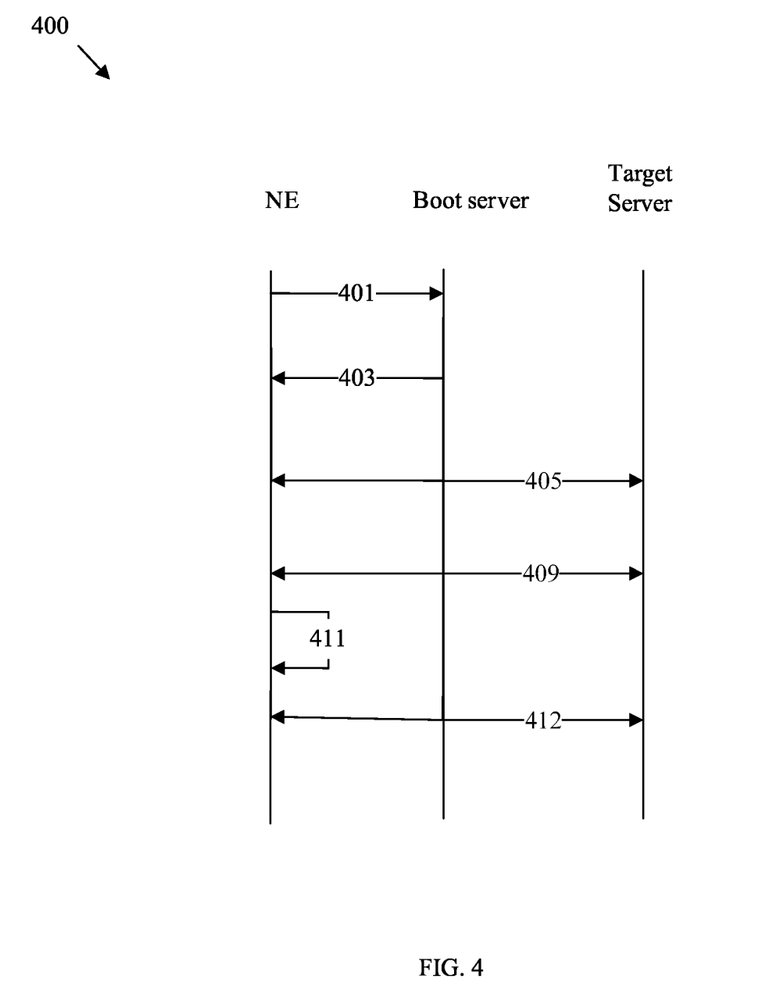
FIG. 4 is a protocol diagram of an embodiment of a method of bootstrapping from a remote image file via a network.

FIG. 4 is a protocol diagram of an embodiment of a method 400 of bootstrapping from a remote image file, such as image file 131 and/or 331, via a network such as network 100. For example, method 400 may be implemented on an NE 100, a boot server 120, and a target server 130 via a network 140. At step 401, an NE may startup and initiate an initial bootloader (e.g. initial bootloader 111). The initial bootloader may query a boot server to determine the location of a remote image file to perform a bootstrapping process. At step 403, the boot server may respond with an IP address associated with the target server that comprises the remote image file, a file name of the remote image file, and a configuration indicating a location of a final bootloader (e.g. final bootloader 332) in the remote image file. At step 405, the initial bootloader may mount the remote image file based on data from the boot server and download the final bootloader. The final bootloader may be configured with configuration data indicating the structure of the image file. At step 409, the final bootloader may download a kernel (e.g. kernel 333) At step 411, the final bootloader may initiate execution of the kernel and terminate. The kernel may initialize and configure all the local devices and other operating system resources used by application processes residing on the NE. At step 412, the kernel may download an initial root file system (e.g. initial root file system 335) and execute and programs within the initial root file system to enable mounting of a final root file system. The kernel may then employ the final root file system to complete the bootstrap process. The kernel may additionally download any other systems files (e.g. system files 334) needed to operate. For example, the kernel may download a root file system tailored for the client and/or any other files needed for proper operation of the client on an as needed basis. By mounting the remote image file, the method 400 may bootstrap a client device over a network without downloading the entire image file, which may reduce network traffic and may alleviate requirements for the client to comprise a hard disk and/or CD-ROM input. For example, all downloaded files may be maintained in RAM during bootstrapping. Accordingly, a client device performing a bootstrapping process based on method 400 may consist essentially of a frame, network ports, processing boards, processors, RAM, caches, power supply, and/or any inputs/outputs desired for typical operation (e.g. no long term storage/hard disk), which may reduce power costs for the device, complexity of the device, manufacturing costs of the device. Further, elimination of local copies of a file system in favor of a single file system image stored in a network may eliminate file system inconsistencies between client devices and reduce image management issues.

Figure 5:
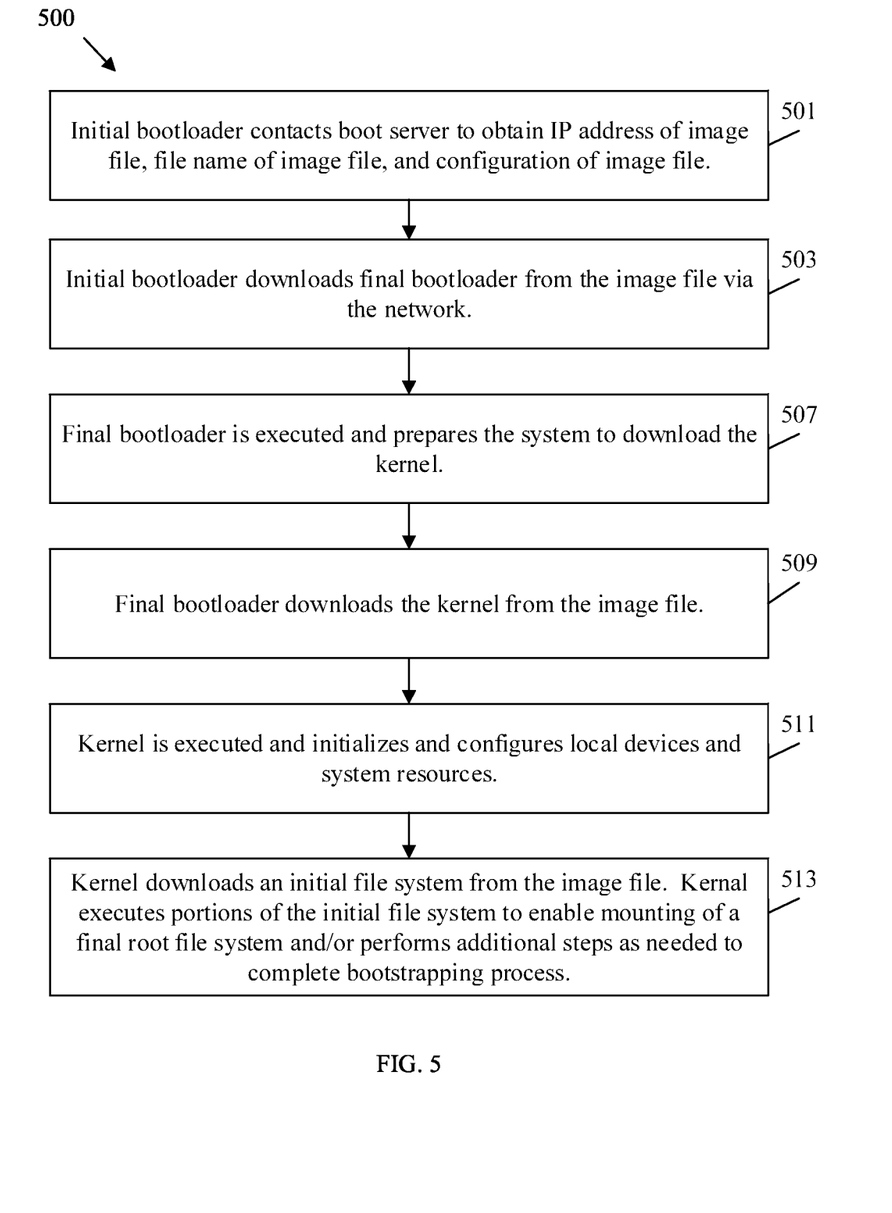
FIG. 5 is a flow chart of an embodiment of a method of bootstrapping from a remote image file via a network.

FIG. 5 is a flow chart of an embodiment of a method 500 of bootstrapping (e.g. by a client device such as NE 110) from a remote image file (e.g. remote image file 131 and/or 331) via a network (e.g. network 100). For example, method 500 may be implemented on an NE 110, a boot server 120, and a target server 130 via a network 140. At step 501, an initial bootloader (e.g. initial bootloader 111) may contact a boot server (e.g. via DHCP) to obtain an IP address associated with the target server that comprises the remote image file, a file name of the remote image file, and a configuration of the image file, which may indicate a location of a final bootloader (e.g. final bootloader 332) in the remote image file. At step 503, the initial bootloader may mount the remote image file based on data from the boot server and download the final bootloader from the image file via the network. The final bootloader may be configured with configuration data indicating the structure of the image file. At step 507, the final bootloader may be executed and may prepare the system to download the kernel. At step 509, the final bootloader may download a kernel (e.g. kernel 333) from the image file. At step 511, the final bootloader may initiate execution of the kernel and terminate. Upon execution, the kernel may initialize and configure local devices and/or system resources on the NE. At step 513, the kernel may download portions of the image file as needed to complete the bootstrapping process, such as an initial root file system (e.g. initial root file system 335). The kernel may execute portion of the initial root file system (e.g. mounting data), mount the final root file system, and perform other steps as needed to complete bootstrapping process. The kernel may additionally download any other systems files (e.g. system files 334) needed to operate. For example, the kernel may download additional root file system(s) tailored for the client and/or any other files needed for proper operation of the client on an as needed basis. By mounting the remote image file, the method 500 may bootstrap a client device over a network without downloading the entire image file, which may reduce network traffic and may alleviate requirements for the client to comprise a hard disk and/or CD-ROM input. Accordingly, a client device performing a bootstrapping process based on method 500 may consist essentially of a frame, network ports, processing boards, processors, RAM, caches, power supply, and/or any inputs/outputs desired for typical operation, which may reduce power costs for the device, complexity of the device, manufacturing costs of the device.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method of bootstrapping from a remote image file comprising:
    loading, by a processor, an initial bootloader;
    employing the initial bootloader to download a final bootloader from the remote image file via a network;
    employing the final bootloader to download a kernel;
    executing the kernel to download root file system mounting data from the remote image file; and
    executing the kernel to bootstrap the processor based on the root file system mounting data.

2. The method of claim 1, wherein downloading the kernel and the root file system mounting data does not comprise downloading the entire remote image file.

3. The method of claim 1, wherein executing the kernel to bootstrap the processor comprises:
    mounting, by the kernel, the remote image file via the network as a block device based on the root file system mounting data; and
    downloading a final root file system from the mounted remote image file.

4. The method of claim 3, wherein employing the initial bootloader to download the final bootloader comprises querying a boot server to obtain an internet protocol (IP) address associated with a target server that comprises the remote image file, a file name of the remote image file, and a configuration indicating a location of the final bootloader in the remote image file.

5. The method of claim 4, wherein the boot server is queried via a Dynamic Host Configuration Protocol (DHCP).

6. The method of claim 4, wherein the root file system mounting data is downloaded from an initial ramdisk (initrd) file.

7. The method of claim 1, wherein all downloaded files are stored to a random access memory (RAM) and no downloaded files are stored to a hard disk.

8. A network element (NE) comprising:
    a transmitter;
    a receiver;
    a memory; and
    a processor coupled to the transmitter, receiver, and memory, configured to cause the NE to:
    load an initial bootloader to memory;
    execute the initial bootloader to download a final bootloader from a remote image file via a network;
    execute the final bootloader to download a kernel;
    execute the kernel to download root file system mounting data from the remote image; and
    employ the kernel to complete a bootstrapping process based on the root file system mounting data.

9. The NE of claim 8, wherein the NE does not comprise a hard drive or a Compact Disk Read Only Memory (CD-ROM) input.

10. The NE of claim 8, wherein the root file system mounting data comprises only data needed to allow the kernel to mount the remote image file as a block device.

11. The NE of claim 10, wherein executing the kernel comprises:
    mounting the remote image file as a block device based on the root file system mounting data; and
    downloading a root file system from the remote image file.

12. The NE of claim 8, wherein the processor is further configured to cause the NE to query a boot server to obtain an internet protocol (IP) address associated with a target server that comprises the remote image file, a file name of the remote image file, and a configuration indicating a location of the final bootloader in the remote image file.

13. The NE of claim 12, wherein the boot server is queried via a Dynamic Host Configuration Protocol (DHCP).

14. The NE of claim 8, wherein the entire remote image file is not downloaded.

15. A network element (NE) comprising:
    a memory configured to store a bootable image file comprising a bootloader, a kernel, and root file system mounting data, wherein the bootloader is configured to mount the image file and download the kernel when executed by a client, and wherein the kernel is configured to download the root file system mounting data and mount the image file based on the root file system mounting data when executed by the client;
    a receiver configured to receive download requests from the client;
    a processor coupled to the memory and the receiver and configured to process download requests from the client; and a transmitter coupled to the processor and configured to transmit at least some of the bootable image file to the client via a network in response to download requests from the client.

16. The NE of claim 15, wherein the bootable image file further comprises an initial root file system, and wherein the kernel is further configured to download the initial root file system when executed by the client and perform a bootstrapping process based on the initial root file system.

17. The NE of claim 16, wherein the initial root file system is an initial ramdisk (initrd) file.

18. The NE of claim 15, wherein the transmitter is not configured to transmit the entire bootable image file in response to a single request from the client.

19. The NE of claim 15, wherein the bootable image file is an International Standards Organization 9660 (.iso) file.

20. The NE of claim 15, wherein the bootable image file is configured to be transmitted to, and executed by, a plurality of clients without read only memory (ROM).

* * * * *